United States Patent
Saito et al.

(10) Patent No.: US 6,752,120 B2
(45) Date of Patent: Jun. 22, 2004

(54) CRANKSHAFT AND ENGINE

(75) Inventors: Toshiyuki Saito, Toyoake (JP); Shinji Soma, Handa (JP); Naoki Ito, Handa (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/354,085

(22) Filed: Jan. 30, 2003

(65) Prior Publication Data

US 2003/0177999 A1 Sep. 25, 2003

(30) Foreign Application Priority Data

Mar. 25, 2002 (JP) .......................................... 2002-082775
May 29, 2002 (JP) .......................................... 2002-155531

(51) Int. Cl.[7] ................................................ F02B 75/32
(52) U.S. Cl. ...................................... 123/197.4; 74/595
(58) Field of Search ........................... 123/197.4; 74/594

(56) References Cited

U.S. PATENT DOCUMENTS 6,082,904 A    7/2000    Ono et al. .................. 384/291

FOREIGN PATENT DOCUMENTS

| EP | 1 103 724 | 5/2001 |
| GB | 1 048 534 | 11/1966 |
| JP | 5-71359 | 3/1993 |

*Primary Examiner*—Noah P. Kamen
(74) *Attorney, Agent, or Firm*—Oblon, Spivak, McClelland, Maier & Neustadt, P.C.

(57) ABSTRACT

A crankpin 1 of a crankshaft rotatably supports a big end of a connecting rod 4 through a sliding bearing 5 fitted therein. The sectional profile of the crankpin 1 takes the form of a polygon whose profile is made of plural arcs of curvature. When the crankpin 1 rotates relative to the bearing 5, the wedge effect is generated to decrease the squeeze loss, a kind of the power loss. And, the oil film thickness between the crankpin 1 and the bearing 5 is secured to prevent the shear loss, another kind of the power loss, from increasing, whereby the power loss can be decreased in total.

17 Claims, 18 Drawing Sheets

RADIAL AXIS OF
CRANK ARM

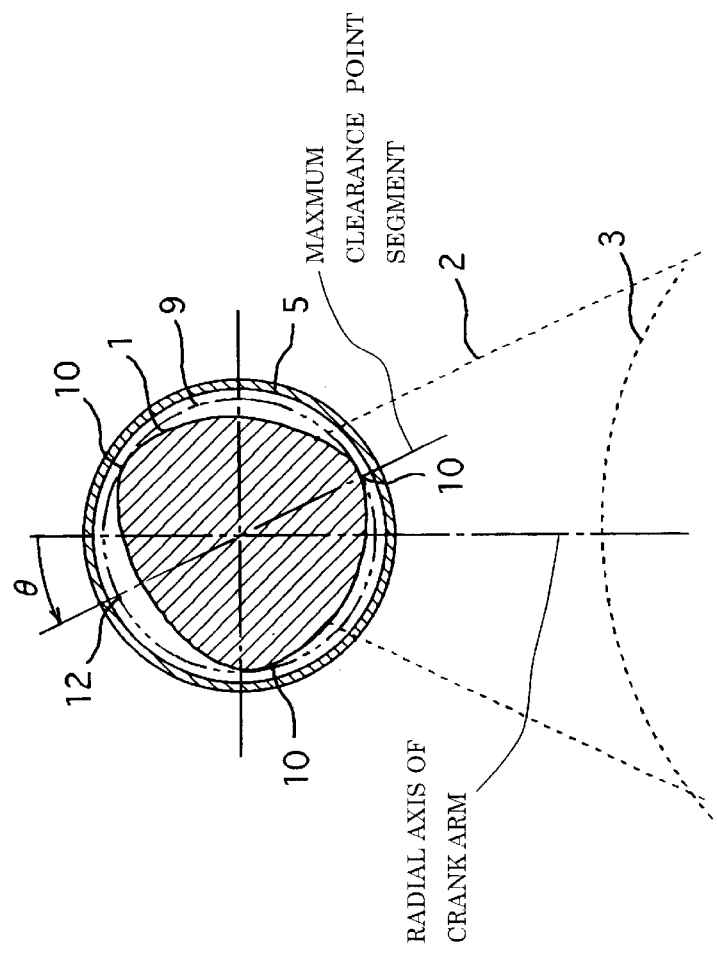
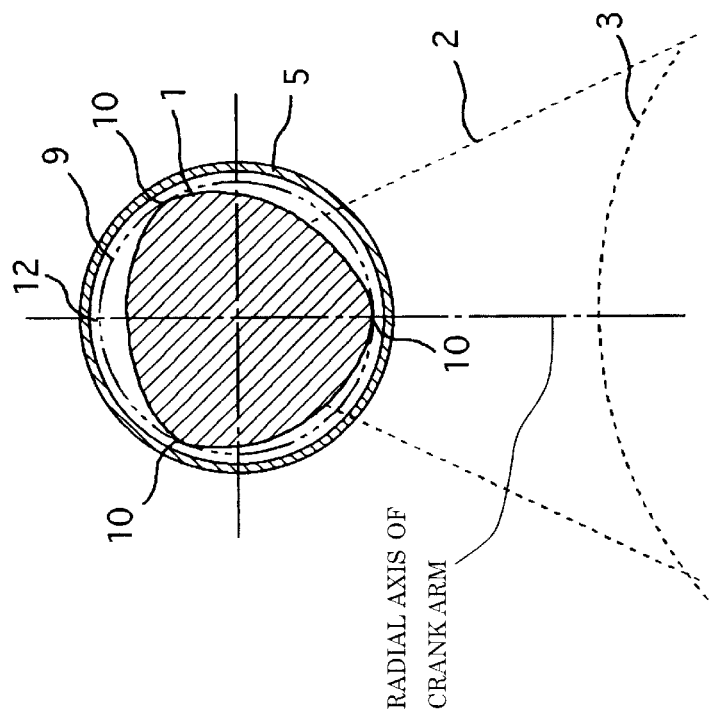

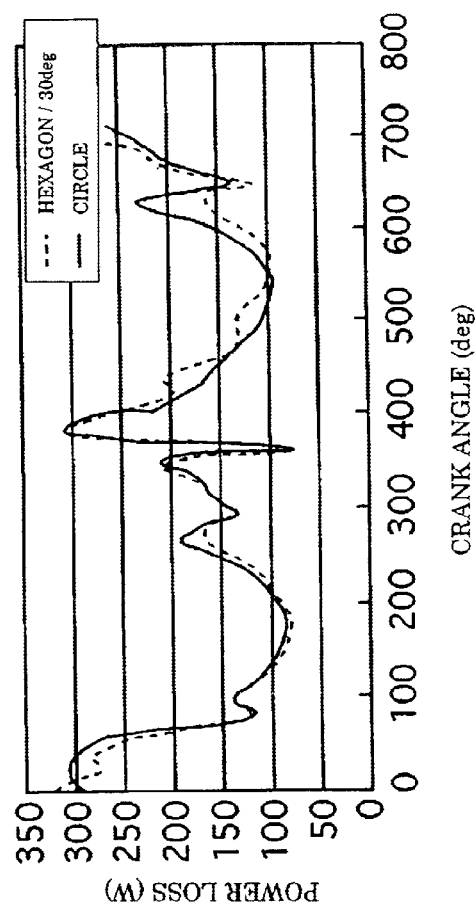
FIG. 13(a)
FIG. 13(b)
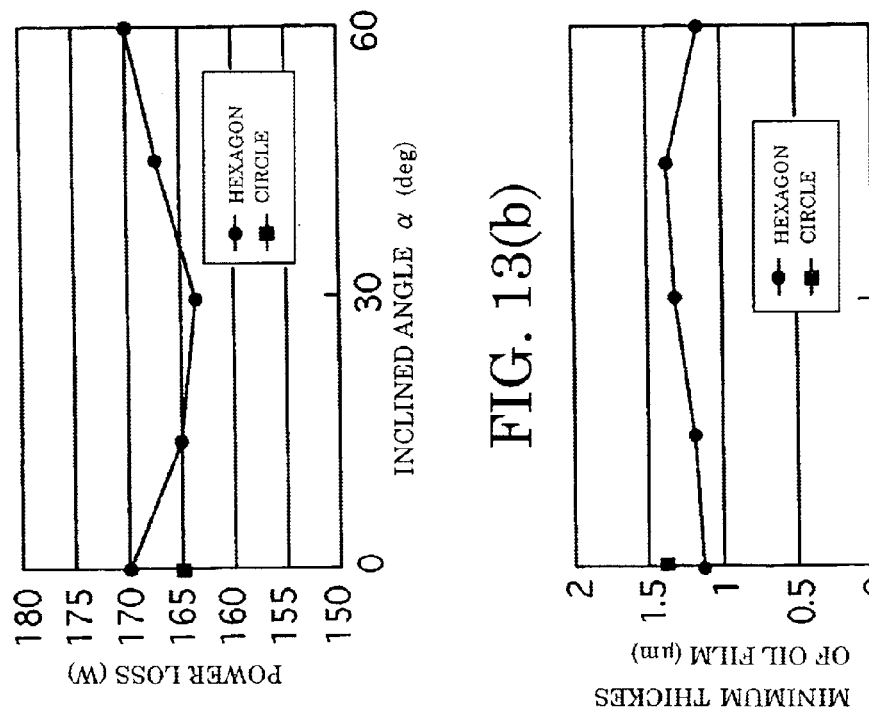
FIG. 13(c)

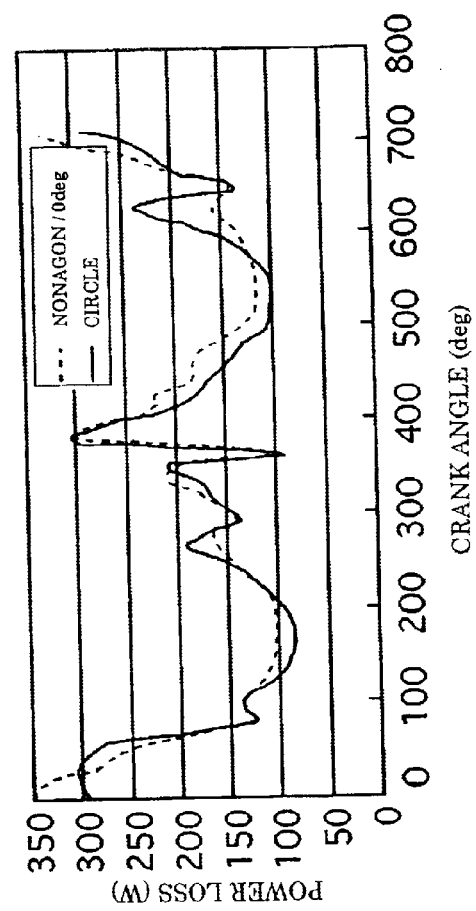
FIG. 15(a)
FIG. 15(b)
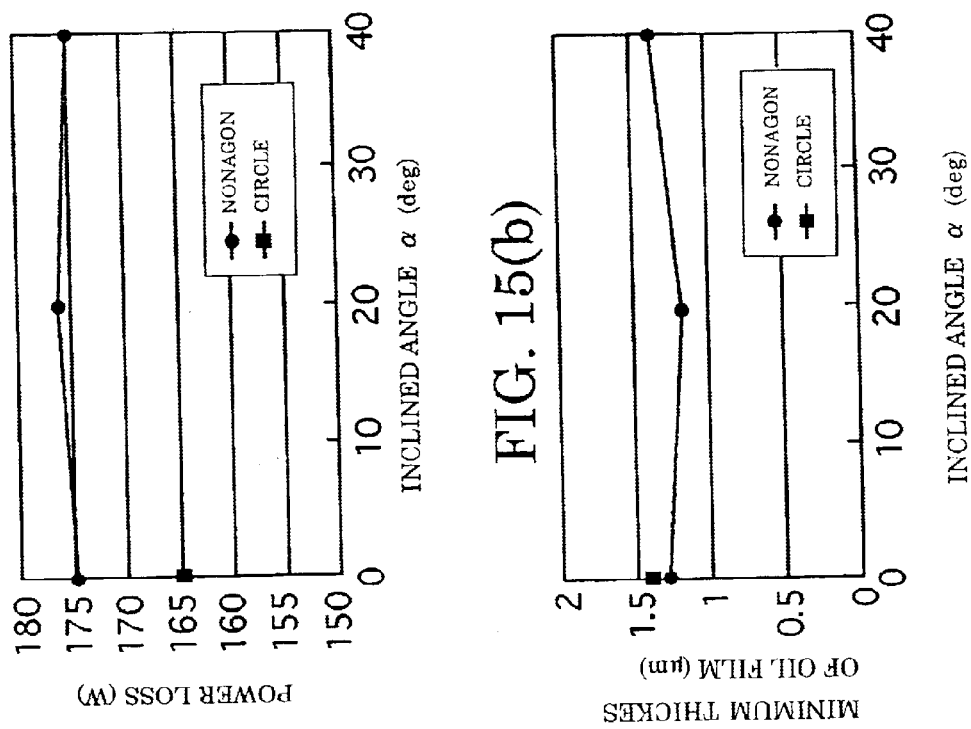
FIG. 15(c)

FIG. 16

| SECTIONAL PROFILE OF CRANKPIN | INCLINED ANGLE $\theta$ (deg) | POWER LOSS (W) | MINIMUM THICKNESS OF OIL FILM ($\mu$m) |
|---|---|---|---|
| TRUE CIRCLE | 0 | 165.1755 | 1.402 |
| ELLIPSE | 45 | 158.5198 | 1.275 |
| TRIANGLE | 30 | 156.4428 | 1.428 |
| SQUARE | 45 | 153.5998 | 1.395 |
| HEXAGON | 30 | 163.5468 | 1.366 |
| OCTAGON | 30 | 171.814 | 1.831 |
| NONAGON | 0 | 175.1517 | 1.31 |

CRANKSHAFT AND ENGINE

INCORPORATION BY REFERENCE

The entire disclosure of Japanese Patent Applications Nos. 2002-82775 filed on Mar. 25, 2002 and 2002-155531 filed on May 29, 2002 including specification, drawings and abstract is herein by reference in its entirety.

BACKGROUND OF THE INVENTION

1. Field of the Invention

The present invention relates to a crankshaft and an engine including the crankshaft.

2. Description of the Related Art

Conventionally, a crankshaft installed in an engine converts the reciprocation of a piston 6 into its own rotation through a connecting rod 4, as shown in FIG. 18. Specifically, at first, the reciprocation of the piston 6 is transmitted to the connecting rod 4. Then, a crankpin 1, supporting a big end of the connecting rod 4 via a sliding bearing 5, of the crankshaft revolves around a crank journal, whereby the crankshaft rotates.

In general, a four-stroke engine works through the intake stroke, the compression stroke, the explosion stroke and the exhaust stroke as its one cycle. During each stroke, the point changes where the maximum load acts on the crankpin 1. For example, at the top dead center (T.D.C.) in the compression stroke, the top side of the crankpin 1 (close to the piston 6) indicated at a point B in FIG. 18 is loaded with the maximum explosion force. At the bottom dead center (B.D.C.) in the intake and the exhaust strokes, the top side of the crankpin 1 (close to the piston 6) indicated at the point B in FIG. 18 is loaded the maximum inertia force in the stroke. At the T.D.C. in the intake stroke, the bottom side of the crankpin 1 (opposite to the piston 6) indicated at a point A in FIG. 18 is loaded with the maximum inertia force in the stroke. Taking into consideration the inertia force loaded onto the bearing 5 in connection with the revolution of the crankpin 1, the relative movement between the bearing 5 and the crankpin 1 changes to oppose each other in the moving direction of the piston 6 at the T.D.C. and B.D.C.

As the above, during each stroke, the point loaded with the maximum force moves from the top side close to the piston 6 of the crankpin 1 to the bottom side opposite to the piston 6, and vice versa, for example. As a result, changes occur in the oil film thickness at a bearing clearance between the crankpin 1 and the sliding bearing 5. Especially, at the point A of the T.D.C. in the intake stroke and the point B of the B.D.C. in the intake stroke etc., the clearance between the crankpin 1 and the sliding bearing 5 is decreased with the high load, whereby the oil film therebetween may be sheared. As the oil film becomes thin, shear resistance increases. Further, in the case of the oil film being sheared, the power loss of the engine increases since the friction resistance increases between the crankpin 1 and the bearing 5 of the big end of the connecting rod 4. The power loss amounts to hydraulic loss as the resistance therebetween. Specifically, the power loss is the sum of the shear loss caused by rotational hydraulic resistance and the squeeze loss caused by the hydraulic compression loss which is attributed to the deviation of the bearing axis from the crankpin axis. The less the oil film thickness becomes, the larger the shear loss increases, and the larger the bearing 5 moves, the larger the squeeze loss increases.

Generally, if the power loss is less, the fuel efficiency is higher. With the recent requirement for the higher fuel efficiency, the power loss has been required to be reduced. For smoother rotation of the engine, it has been practice to grind the crankpin 1 as round as possible.

SUMMARY OF THE INVENTION

Accordingly, an object of the present invention is to provide an improved crankshaft capable of resolve the problem on the power loss of the engine.

In order to achieve the object, the inventors of the present invention have been studied and made many try-and-errors, and finally thought of making the sectional profile of the crankshaft non-circular.

A crankshaft according to the present invention comprises a crank journal, a crankpin and a crank arm. The crankpin takes an approximately cylindrical form with the sectional profile characterized below. The sectional profile of the crankpin is encircled and circumscribed by a hypothetical circle. Plural crescent spaces are provided between the sectional profile of the crankpin and the hypothetical circle. Each crescent space is an area surrounded by a part of the sectional profile of the crankpin and a part of the arc of the hypothetical circle wherein the parts are defined between two adjacent contact points.

The crescent space between the sectional profile of the crankpin and the hypothetical circle varies the radial clearance between the crankpin and a bearing attached thereon as the point on the part of the crankpin moves angularly. This advantageously makes the power loss reduce in comparison with in the case of a true circular crankpin, where the crankshaft is installed to an engine.

Further, the point where the radial clearance is the largest in each of the crescent spaces is offset angularly from the radial axis of the crank arm and is located at around the middle between two adjacent contact points.

When the crankshaft is incorporated to the engine, the point where the clearance is the largest is offset angularly from the reciprocating axis of a piston which is at the top dead center or the bottom dead center. This also advantageously makes the power loss reduce in comparison with in the case of the true circular crankpin.

Furthermore, the number of the crescent spaces is determined six at the most. Where the number of the crescent spaces is two, the point having the largest radial clearance advances 45 degrees from the radial axis of the crank arm in the rotational direction of the crank journal. Then, the point advances 30 degrees, 45 degrees and 30 degrees, in the case of three crescent spaces, four crescent spaces and six crescent spaces, respectively. These designs favorably resolve in reducing the power loss, compared with in the case of the true circular crankpin.

Moreover, the sectional profile of the crankpin is designed to a polygon which is formed by connecting plural arcs of curvature in series. These designs also favorably resolve in reducing the power loss, compared with in the case of the true circular crankpin.

BRIEF DESCRIPTION OF THE DRAWINGS

Various other objects, features and many of the attendant advantages of the present invention will be readily appreciated as the same becomes better understood by reference to the following detailed description of the preferred embodiments when considered in connection with the accompanying drawings, in which:

FIGS. 10(a) and 10(b) show the sectional profiles of a crankpin and a bearing therefore in a second embodiment according to the present invention;

FIGS. 13(a), 13(b) and 13(c) are graphs showing the relation between the inclined angle and the power loss, the relation between the inclined angle and the minimum thickness of the oil film and the relation between the crank angle and the power loss, respectively wherein the sectional profile of the crankpin is hexagonal;

FIGS. 15(a), 15(b) and 15(c) are graphs showing the relation between the inclined angle and the power loss, the relation between the inclined angle and the minimum thickness of the oil film and the relation between the crank angle and the power loss, respectively wherein the sectional profile of the crankpin is nonagonal;

FIG. 16 is a table showing the results of analysis in the second embodiment;

DESCRIPTION OF THE PREFERRED EMBODIMENTS

The present invention will be described in grater detail by reference preferred embodiments to FIGS. 1 to 17.

Figure 1:
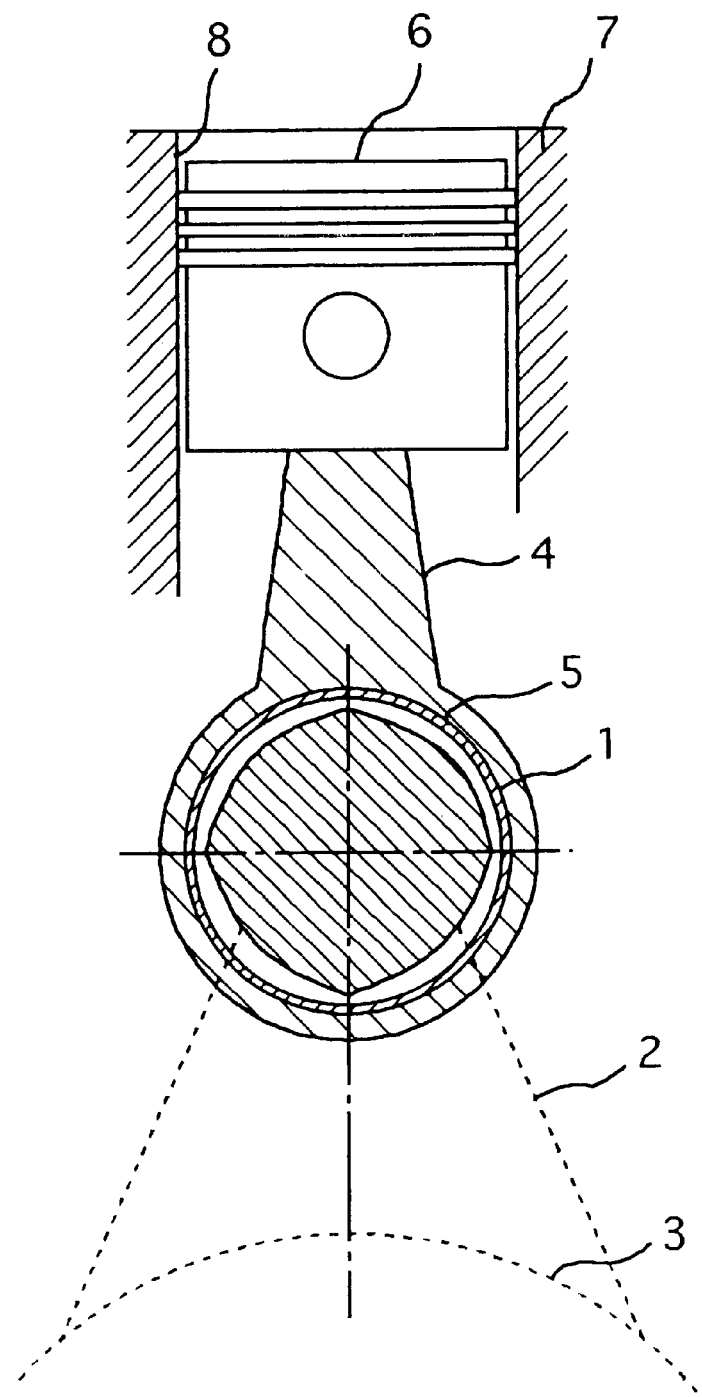
FIG. 1 shows the general concept of the configuration of a crankpin, a connecting rod and a piston according to the present invention.

FIG. 1 shows a part of an engine in the general concept according to the present invention. A cylinder 8 is formed in a cylinder block 7 of the engine. A piston 6 is attached to a small end of a connecting rod 4 via a pin which reciprocates in the cylinder 8 and pivots on the small end at the connecting rod 4. The piston 6 pivots about the pin perpendicular to its own reciprocating direction.

A crankshaft includes a crank journal 3, a crankpin 1 and a crank arm 2. The crank journal 3 is borne with a crankshaft bearing of a crankcase, not shown. The crankpin 1 supports a big end of the connecting rod 4 through a sliding bearing 5 fitted therein. The crank arm 2 connects the crankpin 1 with the crank journal 3. And, the crankpin 1 is approximately formed as cylindrical.

Generally, the crankshaft of the engine converts reciprocation of the piston 6 into its own rotation through the connecting rod 4. The engine generates the power as the rotational force converted from the explosion force, that the piston 6 gains at the explosion stroke. In other strokes that are the intake stroke, the compression stroke and the exhaust stroke, the explosion force makes the piston 6 reciprocate and the crankpin 1 revolve. The general concept of the present invention will be described taking a four-stroke engine as an example. In general, the four-stroke engine works through the intake, compression, explosion and exhaust strokes as its one cycle. Now, taking into the consideration the inertia force loaded onto the bearing 5 and the revolution of the crankpin 1, the bearing 5 and the crankpin 1 moves against each other at the top dead center (T.D.C.) and the bottom dead center (B.D.C.), in the reciprocating direction of the piston 6.

Figure 2:
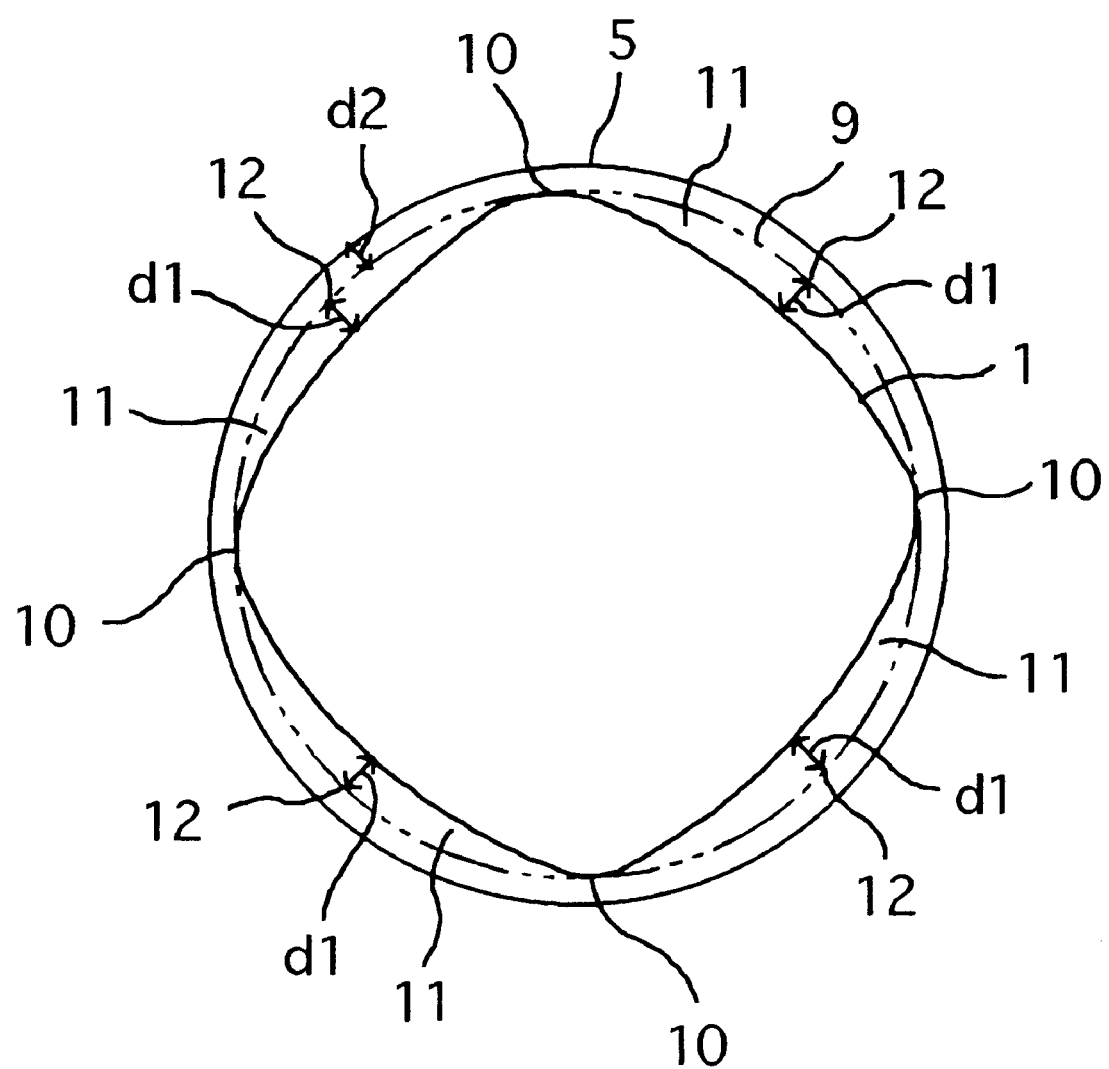
FIG. 2 shows the sectional profile of a crankpin in a general concept according to the present invention.

The sectional profile of the crankpin 1, according to the general concept of the present invention, takes the form of a non-circle. In the microscope world, as shown in FIG. 2, the sectional profile of the crankpin 1, for example, approximately take the form of an equilateral polygon with plural arcs of curvature being connected. Specifically, plural crescent spaces 11 between the sectional profile of the crankpin 1 and a hypothetical circle 9 which encircles and circumscribes the polygon 1 are formed at equiangular distance. Each crescent space 11 is an area surrounded by a part of the sectional profile of the crankpin 1 and a part of the arc of the hypothetical circle 9 wherein the parts are defined between two adjacent contact points 10. Usually, the diameter of the hypothetical circle 9 is a little smaller than that of the inner surface of the sliding bearing 5 fitted into the big end of the connecting rod 4.

In each crescent space 11, the hypothetical circle 9 defines there on a point 12 with the maximum radial clearance (hereinafter called "maximum clearance point"), and is located around the middle of two adjacent contact points 10. As shown in FIG. 2, where the number of the contact points 10 is four, the number of the maximum clearance points 12 is also four. Therefore, each crescent space 11 has one maximum clearance point 12. And, the line segment which passes through the maximum radial clearance connects the maximum clearance points 12 with the center of the hypothetical circle 9, across around the middle of the side of the polygon 1. Reference d1 denotes the maximum radial clearance between the sectional profile of the crankpin 1 and the hypothetical circle 9 on each line segment, and is hereinafter called "maximum clearance". Each maximum clearance d1 is not necessary to be formed equally.

Lubricant oil is filled in the clearance between the crankpin 1 and the bearing 5. The shear loss, a kind of the power loss, is in inverse relation to the cube of the oil film thickness so that a thicker oil film is desirable.

The shape of the polygon 1 provides the wedge effect with rotation of the crankpin 1 relative to the bearing 5 (hereinafter called "rotation of the crankpin"). In the present invention, the wedge effect generates at the point where the maximum load acts so that the power loss is decreased. The reason is because of the reduction in the squeeze loss, another kind of the power loss, which occurs when the inertia force acting on the bearing 5 and the crankpin 1 move in opposite direction.

Here, the sectional profile of the crankpin 1, except for the contact points 10 and its neighborhood, is formed from the arc whose radius of curvature is larger than that of the hypothetical circle 9. The radial clearance d2 exists between the hypothetical circle 9 and the bearing 5. Actually, each crescent space 11 between the polygon 1 and the hypothetical circle 9 is small although that in FIG. 2 is illustrated in exaggerated scale. The word "polygon" used herein covers the polygon, ellipse, triangle, square or etc. Where the number of the contact points 10 are two, the sectional profile of the crankpin 1 is an ellipse.

Hereinafter, several embodiments will be described using the foregoing crankpin 1. In the embodiments below, the power loss of the engine is analyzed, whereby the polygon 1 is formed in the combination of plural arcs of ellipses, for easier machining. If possible, the polygon 1 may be formed from in the combination of plural lines or another curves.

Figure 3:
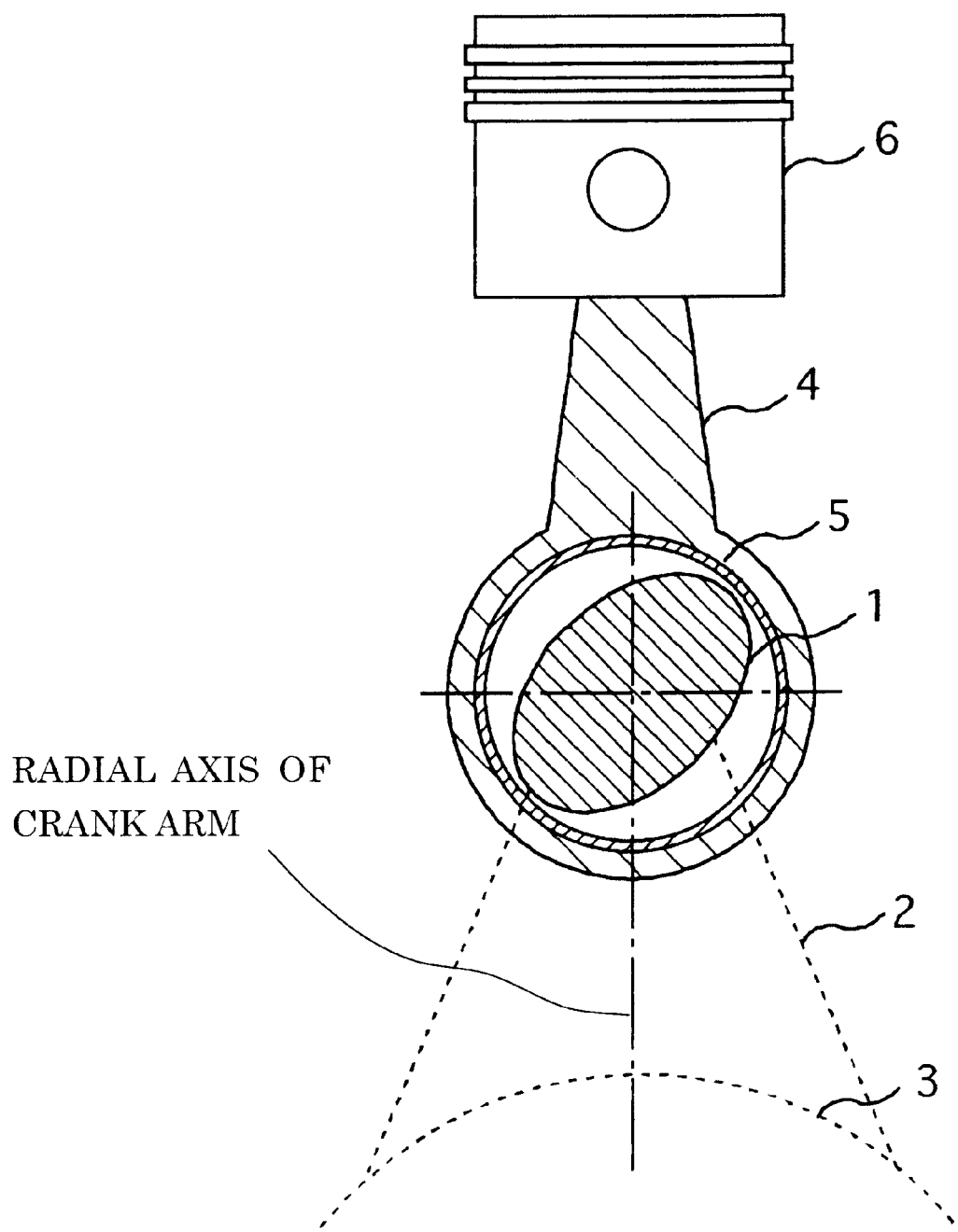
FIG. 3 shows the arrangement of a crankpin, a connecting rod and a piston in a first embodiment of the present invention.
Figure 4:
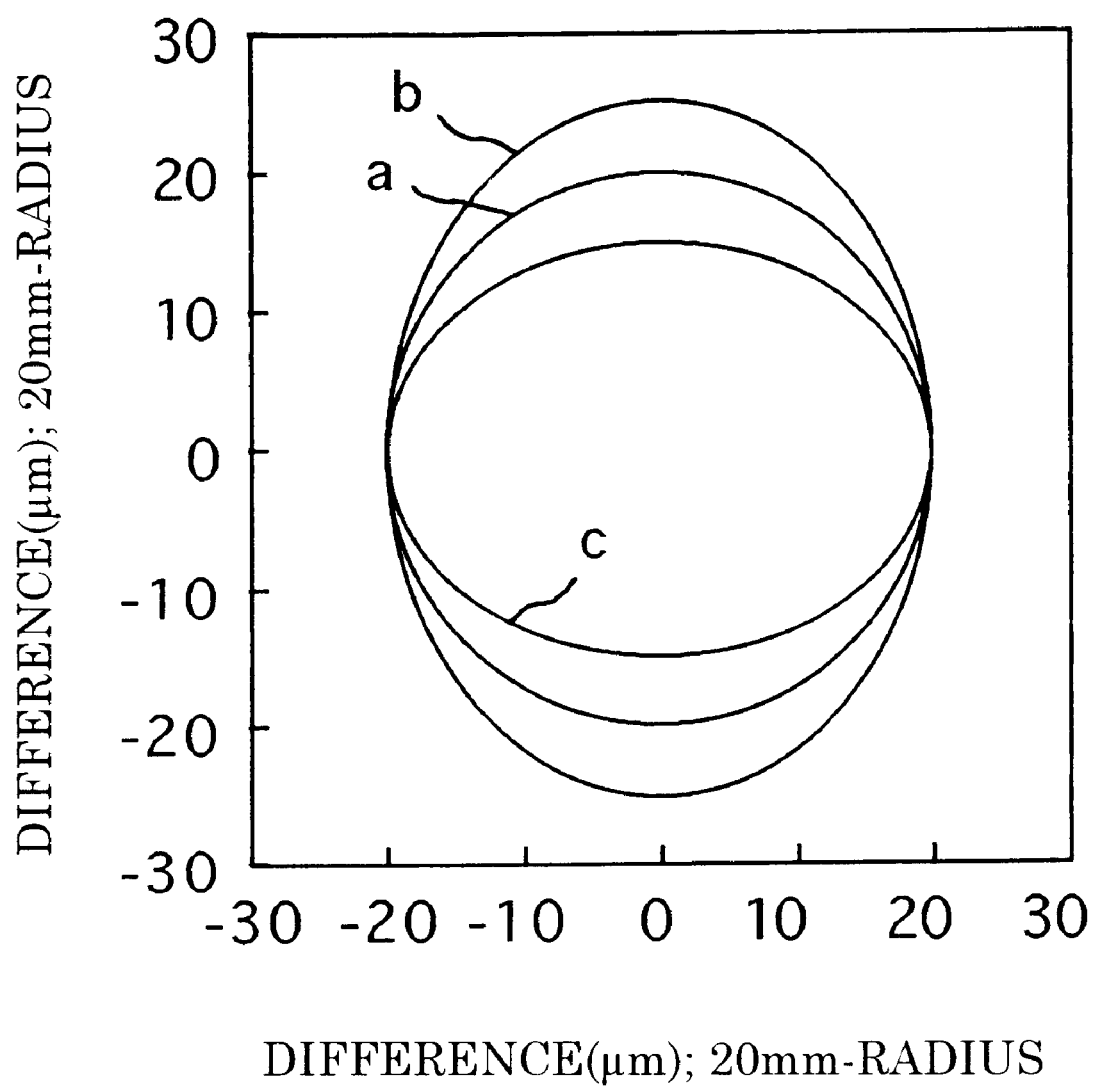
FIG. 4 shows the sectional profiles of the crankpin to be analyzed in the first embodiment.

A first embodiment of the present invention will be described with reference to FIGS. 3 to 9. FIG. 3 schematically shows the sectional profile, of the crankpin 1 in the first embodiment. In the embodiment, the hypothetical circle 9 is omitted from, and not shown in FIGS. 3 to 9. As shown in FIG. 3, the sectional profile of the crankpin 1 is elliptic. The crankpin 1 is connected with the crank journal 3 through the crank arm 2. The sliding bearing 5 fitted into the big end of the connecting rod 4 is true circular in the sectional profile. The small end of the connecting rod 4 is connected with the piston 6. FIG. 3 shows the piston 6 is located at the top dead center (T.D.C.).

Where the sectional profile of the crankpin 1 is to be changed, the power loss is analyzed which is made based on three kinds of sectional profiles "a", "b" and "c" of the crankpin 1 shown in FIG. 4. The sectional profiles are, a true circular crankpin "a" whose diameter is 40 mm, an elliptic crankpin "b" which is vertically about 10 μm larger than the crankpin "a", and an elliptic crankpin "c" which is vertically about 10 μm smaller than the crankpin "a". Hereinafter, the sectional profile of the crankpin "b" is called "thick ellipse", and whereas that of crankpin "c" is called "thin ellipse". FIG. 4 shows the sectional profiles of the crankpins "a", "b" and "c" located at the T.D.C.

Figure 5:
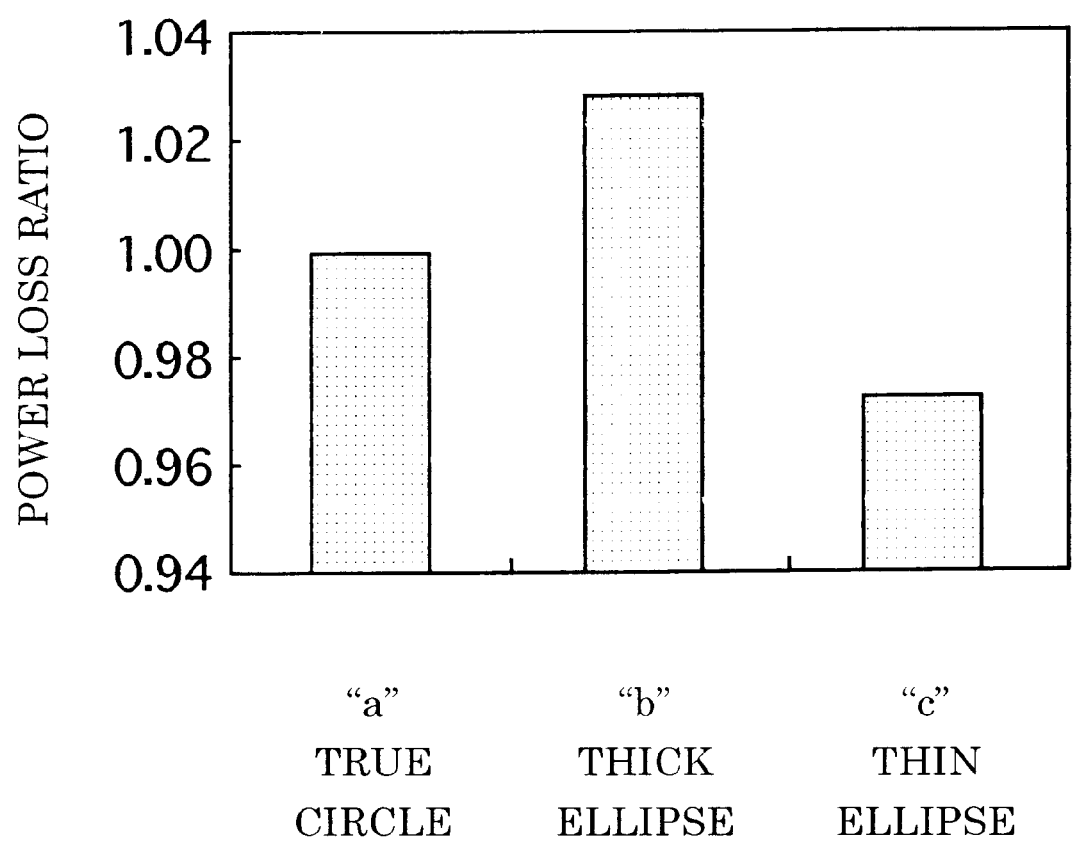
FIG. 5 is the result in the analysis of those profiles shown in FIG. 4.
Figure 6:
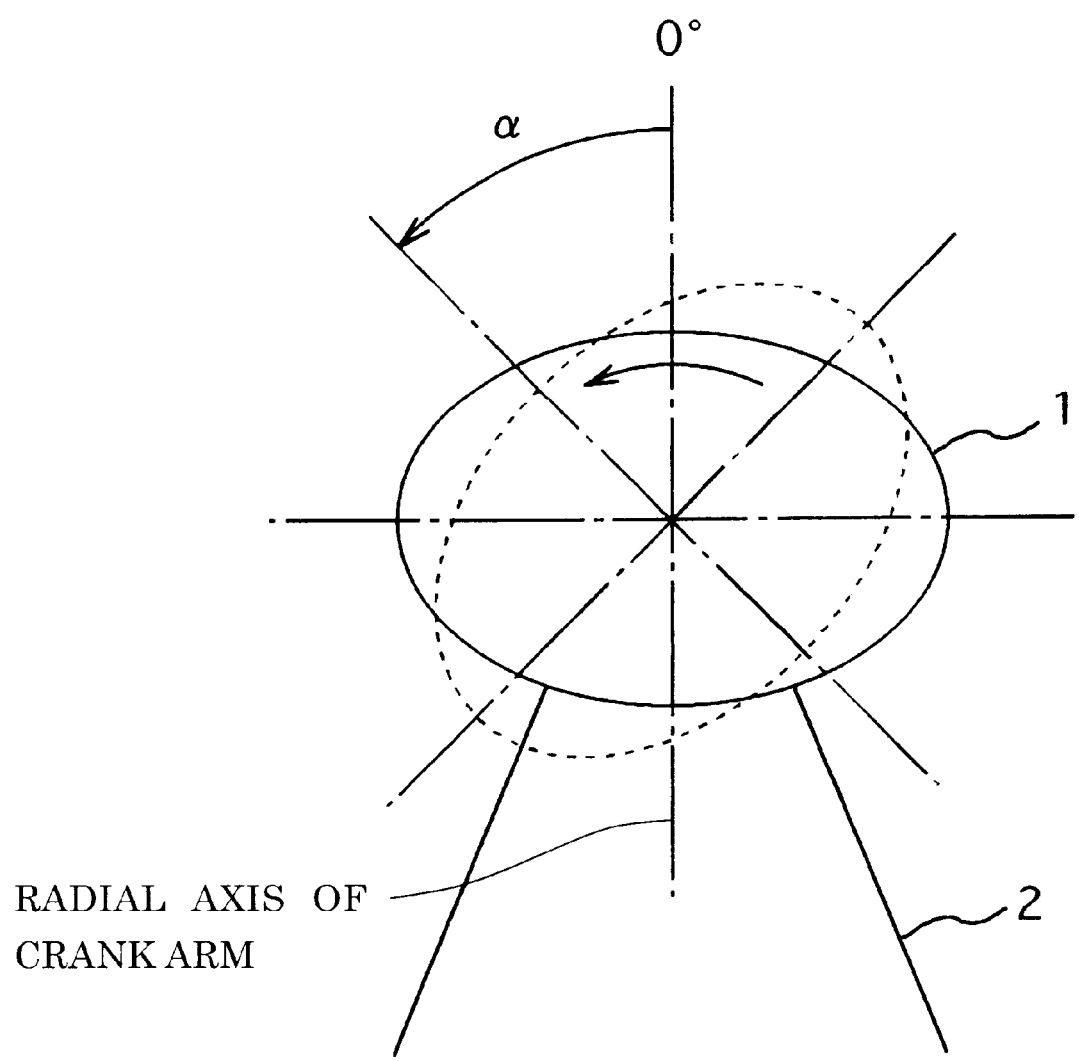
FIG. 6 is an explanatory view for the sectional profile of the crankpin in the first embodiment, particularly showing the inclined angle through which the top side of the crankpin is offset angularly from the radial axis of the crank arm.

FIG. 5 shows the result of analysis in the power loss ratio wherein each of the sectional profile is used in the four-stroke engine. FIG. 5 shows the power loss in the case of the crankpin "b" profiled with the thick ellipse and the crankpin "c" profiled with the thin ellipse, wherein the power loss in the case of the circular crankpin "a" is set to the numerical value "1". As shown FIG. 5, the power loss in the case of the crankpin "b" of the thick ellipse is larger than that in the case of the circular crankpin "a", and the power loss in the case of the crankpin "c" of the thin ellipse is smaller than that in the case of the circular crankpin "a".

Figure 7A:
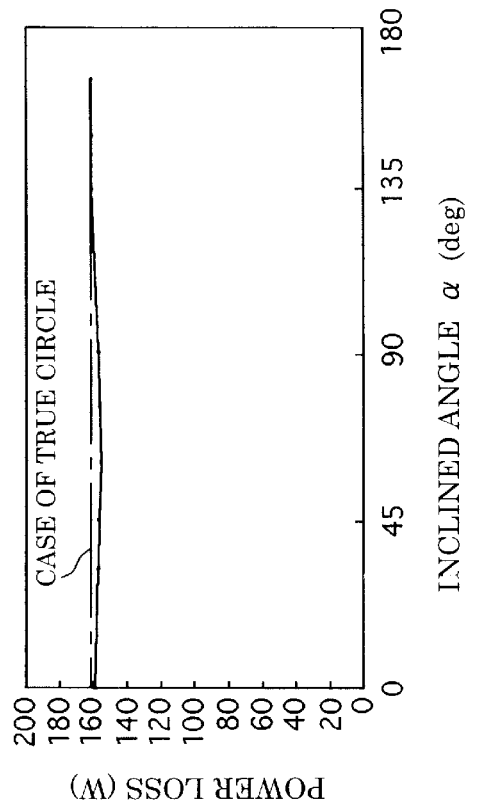
FIGS. 7(a) and 7(b) are graphs showing the relation between the inclined angle and the power loss in thick and thin ellipses "b" and "c" shown in FIG. 4.
Figure 7B:
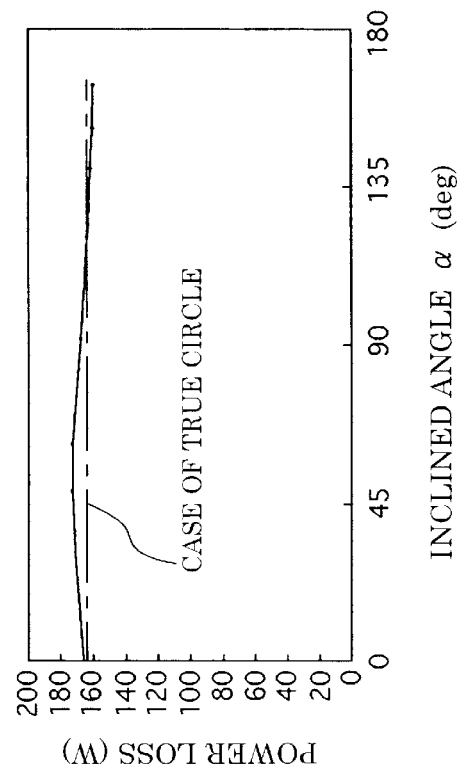

Next, the power loss is analyzed with the inclined angles changed for the crankpin "b" of the thick ellipse and the crankpin "c" of the thin ellipse. The angles will be described with reference to FIG. 6. It is now assumed that a radial crank arm axis connecting the rotational axis of the crank journal 3 with the rotational axis of the crankpin 1 is regarded as 0 degree whatever angle of the crank arm takes about the axis of the crank journal 3. And, the angle of the crankpin 1 rotating around its own rotational axis relative to the bearing 5 is regarded as inclined angle α. The power loss is analyzed with the crankpin 1 located at the inclined angle α ranging from 0 degree to 180 degrees. FIG. 7(a) shows the result of the analysis in the case of the crankpin "b" being the thick ellipse, and FIG. 7(b) shows that in the case of the crankpin "c" being the thin ellipse. As shown in FIG. 7(a), the power loss in the case being the crankpin "b" of the thick ellipse becomes smaller at around 150 degrees of the inclined angle α than that in the case of the true circular crankpin "a". As shown in FIG. 7(b), the power loss in the case of the crankpin "c" being the thin ellipse becomes smaller at around 30 degrees of the inclined angle α than that in the case of the true circular crankpin "a".

Accordingly, the result of analysis demonstrates that the power loss is reduced, where the angle of the line of apsides is behind 90 degrees or the less in the rotational direction of the crankpin 1. As shown in FIG. 5, although the power loss in the case of the crankpin "b" being the thick ellipse increases compared with that in the case of the circular crankpin "a" which however occurs when the line of apsides aligns to the radial crank arm axis. The reason is bacause the point where the maximum force acts corresponds to an apsis of the thick ellipse "b". In other words, the maximum force acts on the point where the clearance between the crankpin "b" and the bearing 5 is the smallest and smaller than that between the circular crankpin "a" and the bearing 5.

Figure 8:
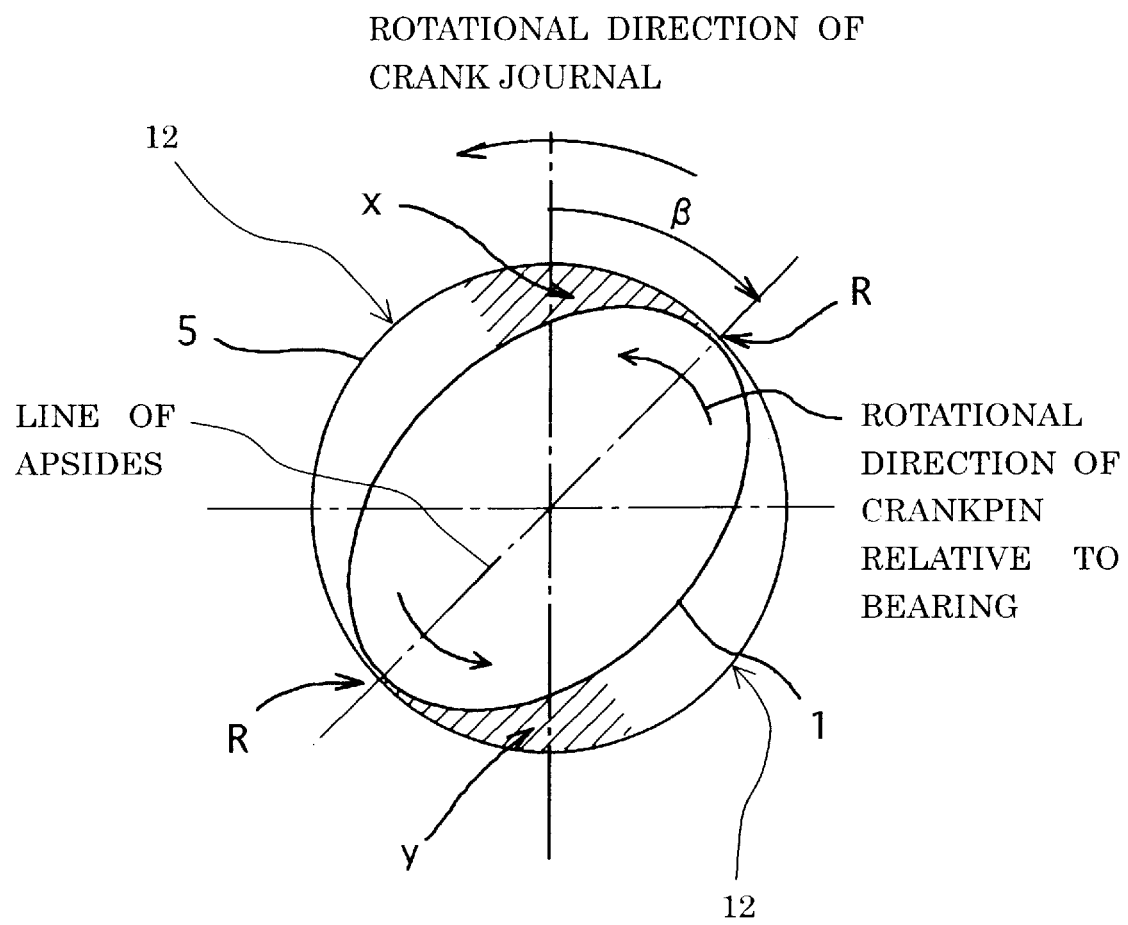
FIG. 8 is an explanatory view showing the crankpin and the bearing at the top dead center in the first embodiment.

FIG. 8 shows the relative rotational position between the crankpin 1 and the bearing 5. Further consideration will be made with FIG. 8. As shown in FIG. 8, the crankpin 1 is formed to be elliptic and the bearing 5 fitted into the big end of the connecting rod 4 is formed to be true circular. Reference R denotes the point where the clearance between the crankpin 1 and the bearing 5 is the smallest, and is hereinafter called "minimum clearance point".

Reference β donates an angle between the line of apsides of the elliptic sectional profile of the crankpin 1 and the radial crank arm axis. At the T.D.C. of the engine of the type wherein the crank journal 3 rotates counter-clockwise, the angle β is set to 45 degrees in the direction opposite to the rotational direction of the crankpin 1 relative to the bearing 5 (hereinafter called "rotational direction of the crankpin"). In other words, the maximum clearance point 12 between the hypothetical circle 9, not shown in FIG. 8, and the sectional profile of the crankpin 1 advances 45 degrees from the radial crank arm axis in the rotational direction of the crankpin 1. In this case, since the rotational direction of the crankpin 1 is counter-clockwise, the lubricant oil is pressurized at areas "x" and "y" with so called "wedge effect" of fluid.

Figure 9:
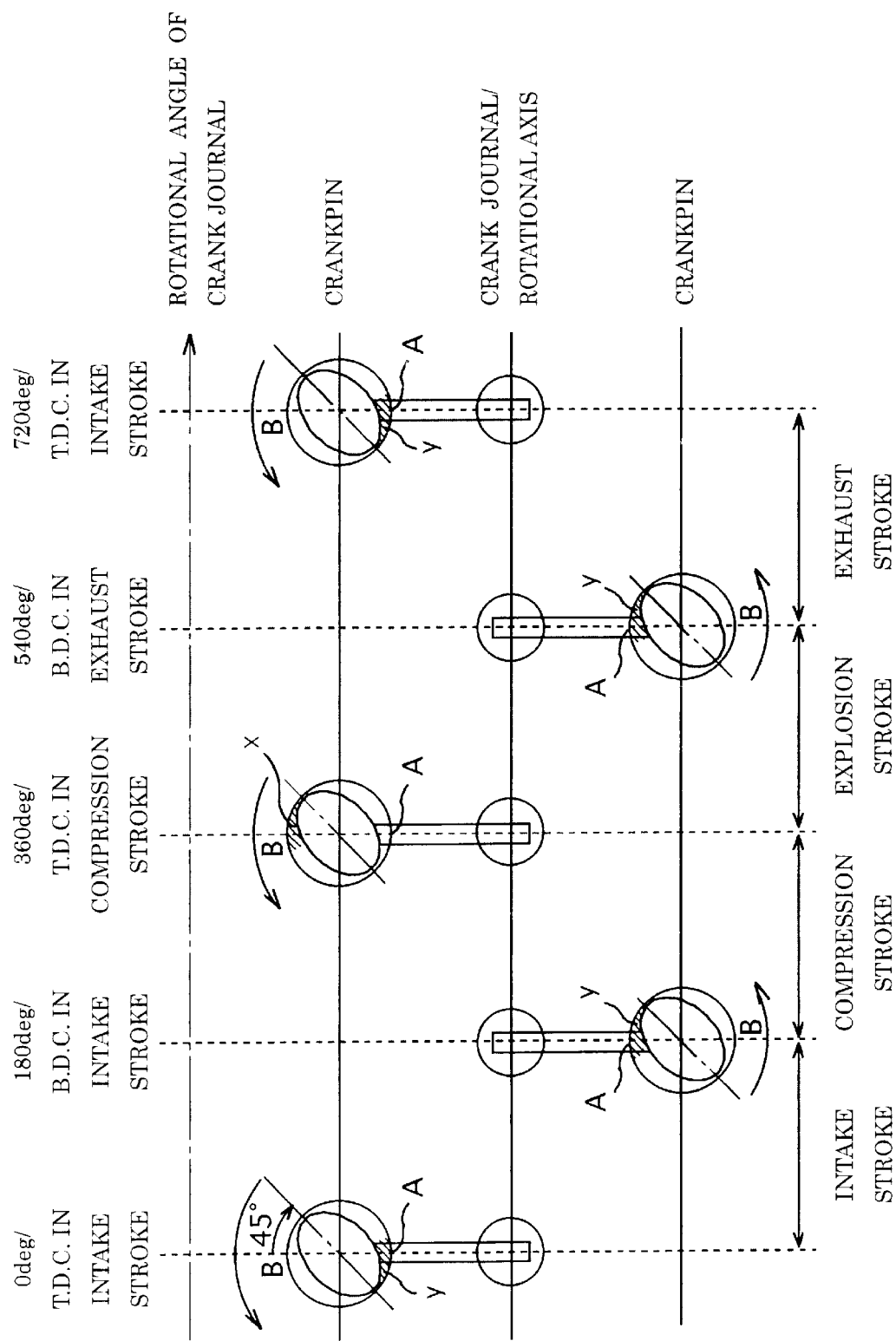
FIG. 9 is an explanatory view showing the piston location of a four-stroke engine in the first embodiment.

Referring then to FIG. 9, the power loss at the T.D.C. and B.D.C. in each stroke will be described hereinafter. At the top dead center (T.D.C.) in the intake stroke, the point A which is the opposite side of the piston 6 is loaded the with the maximum inertia force which urges the connecting rod 4 to be lifted up. Therefore, since the clearance between the crankpin 1 and the bearing 5 at the point A (hereinafter called "bearing clearance") becomes smaller, the lubricant oil at the area "y" pressurized to be exhausted wherein the pressurized oil however acts against the inertia force. At the point A, the bearing clearance remains large enough to prevent the oil film from being sheared.

At the T.D.C. in the compression stroke, the point B which is at the side close to the piston 6 is loaded with the maximum explosion force pressing the piston 6 down. Therefore, since the bearing clearance at the point B becomes smaller, the lubricant oil at the area "x" is pressurized to be exhausted wherein the pressurized oil however acts against the explosion force. At the point B, the bearing clearance remains large enough to prevent the oil film from being sheared.

At the bottom dead center (B.D.C.) in the intake and exhaust strokes, the point A which is at the side close to the piston 6 is loaded with the maximum inertia force. This situation advances half revolution from that shown in FIG. 8 so that the area "y" is on the top side close to the piston 6. Accordingly, the lubricant oil at the area "y" is pressurized to be exhausted wherein the pressurized oil however acts against the inertia force. At the point A, the bearing clearance remains large enough to prevent the oil film from being sheared.

It has been found through analysis that generally the oil film tends to be sheared during the exhaust, intake and compression strokes. As the rotation of the crankpin 1 advances from the exhaust stroke to the intake stroke and further to the compression stroke, the point loaded with the maximum force turns reversely from the side close to the piston 6 to the side opposite to the piston 6. As shown in FIG. 8, the apsis of the elliptic crankpin 1 is offset angularly from the maximum-loaded point A or B of the bearing 5 of the connecting rod 4. In this case, the apsis exists behind the maximum-loaded point in the rotational direction of the crankpin 1. Taking the hypothetical circle 9 (not shown in FIGS. 3 to 9) into consideration, the maximum clearance point 12 is kept to advance from the radial crank arm axis relative to the rotational direction of the crankpin 1. Therefor, at the maximum-loaded point, the wedge effect takes place, whereby the squeeze loss, as a power loss, can be reduced.

A second embodiment of the present invention will be described hereafter with reference to FIGS. 10 to 17. The power loss of the engine will be analyzed for each of those crankpins 1 whose number of the contact points 10 ranges from two to nine. The crankpins 1 described here will be exemplified as having the sectional profile of an equilateral polygon.

FIGS. 10(*a*) and 10(*b*) schematically show a crankpin 1 with three contact points 10 whose sectional profile is triangular. FIGS. 10(*a*) and 10(*b*) also show that the crankpin 1 is located at the T.D.C. FIG. 10(*a*) shows the basic orientation of the crankpin in the analysis. The basic orientation is defined as that in which any one of the maximum clearance points 12 exists on the radial crank arm axis at the side opposite to the crank journal 3. The radial crank arm axis is the line connecting the rotational axis of the crank journal 3 with the center of the hypothetical circle 9 which is in alignment with the rotational axis of the crankpin 1. In the basic orientation, the maximum clearance point segment described above is in alignment with the radial crank arm axis. FIG. 10(*b*) shows an inclined orientation in which the sectional profile of the crankpin 1 rotates an angle θ from the basic orientation in the rotational direction of the crankpin 1, and the angle θ is hereinafter called "inclined angle". The inclined angle θ indicates how much the maximum clearance point segment inclines from the radial crank arm axis relative in the rotational direction of the crankpin 1. In the inclined orientation, the middle of the side of the polygon advances angle θ from the basic orientation in its rotational direction.

Analysis is made for each of those crankpins whose number of the contact points 10 ranges from two to nine, with the variation of the inclined angle θ from 0 degree to 90 degrees. Like the triangle, other polygons than the triangle as shown in FIGS. 10(*a*) and 10(*b*) have their orientations in which the respective maximum clearance point 12 are brought into alignment with the radial crank arm axis. A crankpin 1 of a triangle section having three contact points 10 is analyzed with the inclined angle θ being varied from 0 degree to 90 degrees. A crankpin 1 of square section having four contact points 10 is analyzed with the inclined angle θ being varied from 0 degree to 90 degrees. A crankpin 1 of hexagon section having six contact points 10 is analyzed with the inclined angle θ being varied from 0 degree to 60 degrees. A crankpin 1 of octagon section having eight contact points 10 is analyzed with the inclined angle θ being varied from 0 degree to 30 degrees. A crankpin 1 of nonagon section having nine contact points 10 is analyzed with the inclined angle θ being varied from 0 degree to 40 degrees.

Young's modulus of the crankpin 1 is defined as $2.058*10^2$ GPa. Young's modulus of the bearing 5 is defined as $2.058*10^2$ GPa, and the bearing width, i.e. the length of the bearing 5 along its rotational axis, is also defined as 20 mm. The weigh of the connecting rod 4 is defined as 500 g. The viscosity of the lubricant oil supplied into the clearance between the crankpin 1 and the bearing 5 is defined as 3.65 mPa·s. The diameter of the hypothetical circle 9 is defined as 26 mm. The maximum clearance d1 in each of the crankpins is defined as 5 μm. The clearance d2 between the hypothetical circle 9 and the bearing 5 is defined as 30 μm. The engine speed is defined as 5000 rpm. And, the sectional profile of the bearing 5 takes the form of a true circular.

The result of analysis will be described. At first, the result of analysis for the triangle crankpin 1 will be described with reference to FIGS. 11(*a*), 11(*b*) and 11(*c*). FIG. 11(*a*) shows the power loss in relation to the inclined angle θ. Here, where the sectional profile of the crankpin 1 is circular, the power loss is 165 W. Therefore, as shown in FIG. 11(*a*), where the inclined angle θ is between 10 degrees and 75 degrees, the triangular crankpin 1 is smaller in the power loss than that of the circular crankpin. Where the inclined angle θ is 30 degrees, the power loss is the smallest and about 156 W which provides about 5% reduction in power loss in comparison to that of the circular crankpin.

Moreover, there is analyzed the minimum thickness of the oil film in relation to the inclined angle θ. The oil film thickness represents a radial thickness of the lubricant oil between the crankpin 1 and the bearing 5. The minimum thickness of the oil film represents the radial thickness of a portion where the oil film thickness becomes the smallest during the rotation of the crank journal 3. As the oil film thickness becomes thin, the shear resistance increases to increase the power loss. Further, too thin minimum thickness of the oil film may cause the seizure between the crankpin 1 and the bearing 5. The minimum thickness of the oil film in the case of a crankpin having a true circle of sectional profile is about 1.4 μm, and it is desirable that the minimum thickness of the oil film would be the same to or larger than that in the case of the circular crankpin.

FIG. 11(*b*) shows the result of analysis of the minimum thickness of the oil film in relation to the inclined angle θ, in the case of the triangular crankpin 1. As shown in FIG. 11(*a*), the smallest power loss is attained at 30 degrees of the inclined angle θ at which angle (as shown in FIG. 11(*b*)) the minimum thickness of the oil film is 1.43 μm, a little larger than the oil film thickness in the case of the circular crankpin. Therefore, when the triangular crankpin 1 is inclined 30 degree, the minimum thickness of the oil film can be secured to be as thick as or more than that in the case of the circular crankpin.

Figure 11C:
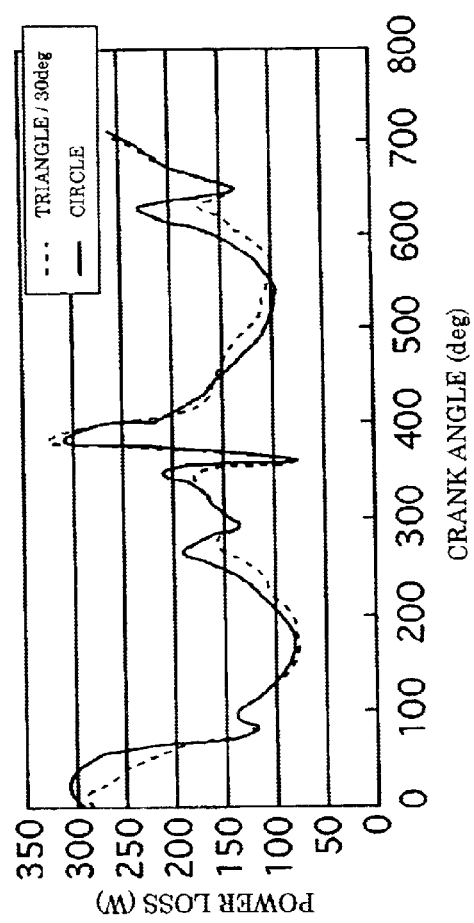
FIGS. 11(a), 11(b) and 11(c) are graphs showing the relation between the inclined angle and the power loss, the relation between the inclined angle and the minimum thickness of the oil film and the relation between the crank angle and the power loss, respectively wherein the sectional profile of the crankpin is triangular.
Figure 11A:
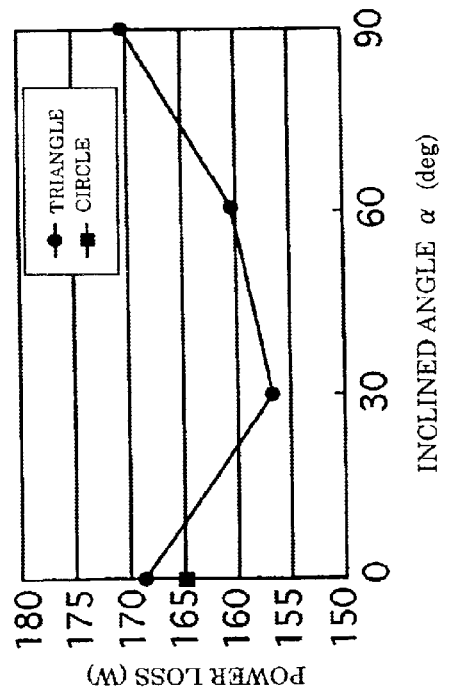
Figure 11B:
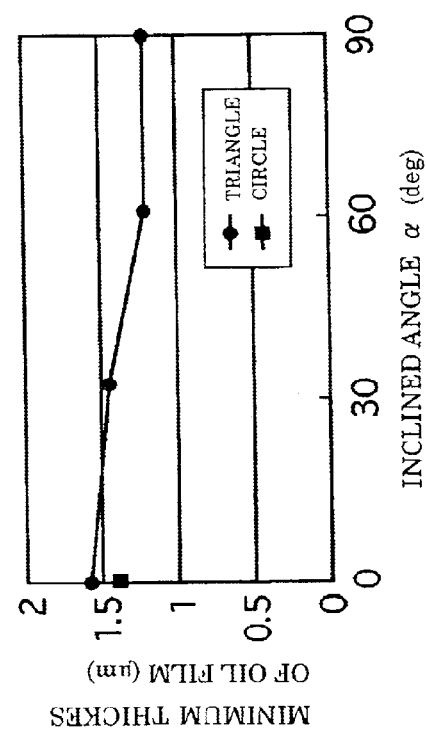

FIG. 11(c) shows the result of analysis in the power loss in relation to a crank angle which rotates from 0 degree to 720 degrees during one cycle of the engine, where the inclined angle θ of the triangular crankpin 1 is chosen to be 30 degrees. The crank angle is defined as 0 degree when the piston 6 is located at the T.D.C. in the intake stroke. When the crank angle takes the position of 180 degrees, the piston 6 is located at the B.D.C. in the compression stroke. Likewose, when the crank angle takes the position of 360 degrees, the piston 6 is located at the T.D.C. in the explosion stroke. Further, with the crank angle at the position of 540 degrees, the piston 6 is located at the B.D.C. in the exhaust stroke. FIG. 11(c) also shows the result of analysis in the case of the circular crankpin. As shown in FIG. 11(c), the power loss of the triangular crankpin 1 is reduced at around 30 degrees, 270 degrees, 330 degrees and 630 degrees, compared with that at the corresponding angles in the case of the circular crankpin. During other strokes than the explosion stroke, the power loss in the case of the triangular crankpin 1 is reduced compared to that in the case of the circular crankpin.

Figure 12A:
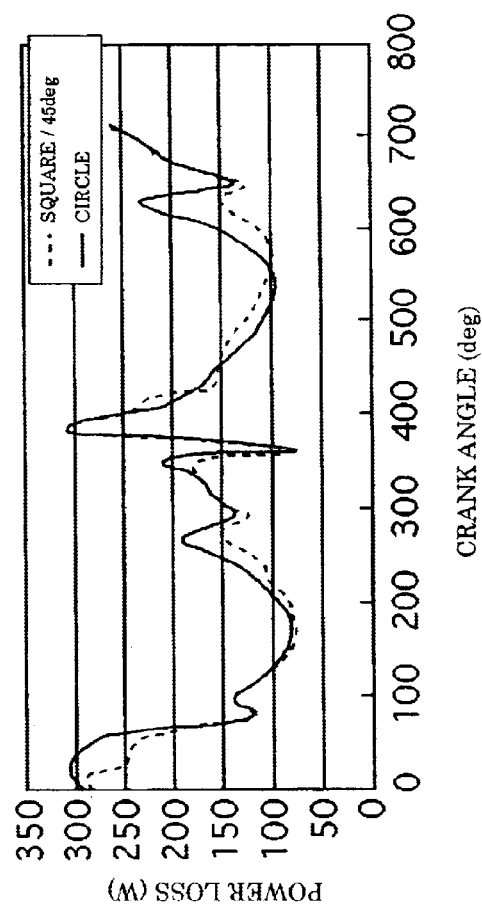
FIGS. 12(a), 12(b) and 12(c) are graphs showing the relation between the inclined angle and the power loss, the relation between the inclined angle and the minimum thickness of the oil film and the relation between the crank angle and the power loss, respectively wherein the sectional profile of the crankpin is square.

Next, the result of analysis in the case of the square crankpin 1 will be described with reference to FIGS. 12(a), 12(b) and 12(c). Referring to FIG. 12(a), where the inclined angle θ is chosen to be between 15 degrees and 75 degrees, the power loss of in the case of the square crankpin 1 decreases compared with that in the case of the circular crankpin. Especially, where the inclined angle θ is chosen to be 45 degrees, the power loss is the smallest and about 153 W which provides about 9% reduction in power loss in comparison to that in the case of the circular crankpin. In addition, the power loss is smaller than that in the case of the triangular crankpin with the inclined angle chosen as 30 degrees.

Figure 12B:
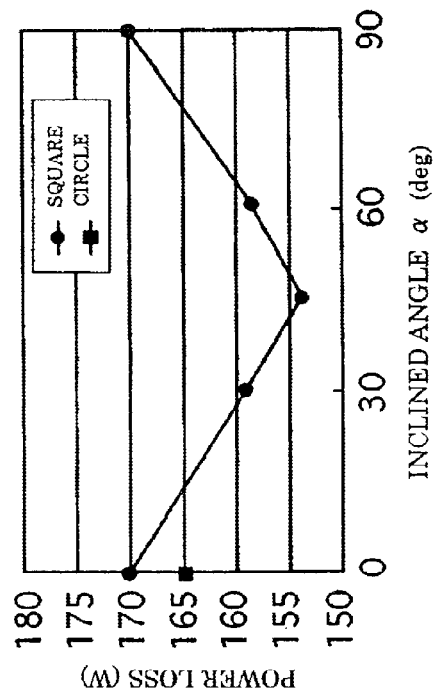

FIG. 12(b) shows the result of analysis in the minimum thickness of the oil film in connection to the inclined angle θ in the case of the square crankpin 1. Where the inclined angle θ is chosen as 45 degrees wherein the smallest power loss is attained, the minimum thickness of the oil film is about 1.39 µm and is nearly equal to that in the case of the circular crankpin. Therefore, where the square crankpin 1 is inclined 45 degrees, the minimum thickness of the oil film is secured as thick as that in the case of the circular crankpin.

Figure 12C:
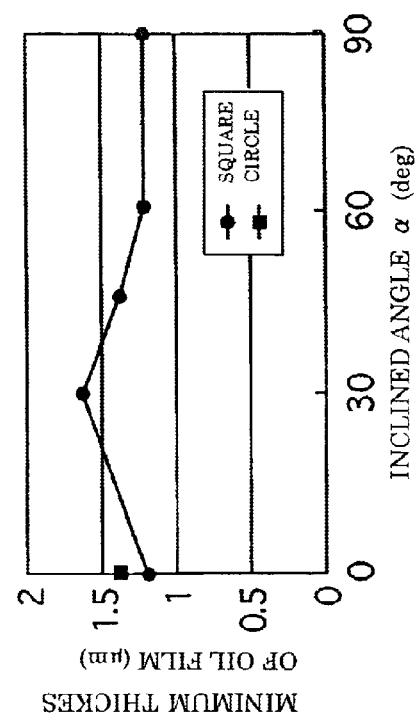

FIG. 12(c) shows the result of analysis in the power loss in connection to the crank angle ranging from 0 degree to 720 degrees for one cycle of the engine where the inclined angle θ of the square crankpin 1 is chosen as 45 degrees. Like in the case of the triangular crankpin, the power loss in the case of the square crankpin 1 is decreased, compared to that in the case of the circular crankpin around 30 degrees, 270 degrees, 330 degrees and 630 degrees of the crank angle.

Next, the result of analysis in the case of the hexagonal crankpin 1 will be described with reference to FIGS. 13(a), 13(b) and 13(c). Referring to FIG. 13(a), where the inclined angle θ is chosen to be between 15 degrees and 35 degrees, the power loss of in the case of the hexagonal crankpin 1 decreases compared with that in the case of the circular crankpin. And, where the inclined angle θ is chosen to be 30 degrees, the power loss is the smallest and about 163 W which provides about 1% reduction in the power loss in comparison to that in the case of the circular crankpin.

FIG. 13(b) shows the result of analysis in the minimum thickness of the oil film in connection to the inclined angle θ in the case of the hexagonal crankpin 1. Where the inclined angle θ is chosen as 30 degrees for the smallest power loss, the minimum thickness of the oil film is about 1.37 µm and is a little less than that in the case of the circular crankpin. However, the wedge effect works to make less squeeze loss, so that the power loss is decreased in total as shown in FIG. 13(a).

FIG. 13(c) shows the result of analysis in the power loss in connection to the crank angle ranging from 0 degree to 720 degrees for one cycle of the engine where the inclined angle θ of the hexagonal crankpin 1 is chosen as 30 degrees. Like in the case of the triangular and square crankpin, the power loss in the case of the hexagonal crankpin 1 is decreased, compared to that in the case of the circular crankpin around 30 degrees, 270 degrees, 330 degrees and 630 degrees of the crank angle.

Next, the result of analysis in the case of the octagonal crankpin 1 will be described with reference to FIGS. 14(a), 14(b) and 14(c). Referring to FIG. 14(a), through out all the range of the inclined angle θ, the power loss in the case of the octagonal crankpin 1 is increased in comparison to that in the case of the circular crankpin. For example, with the inclined angle θ chosen as 30 degrees, the power loss is the smallest and about 172 W.

Figure 14C:
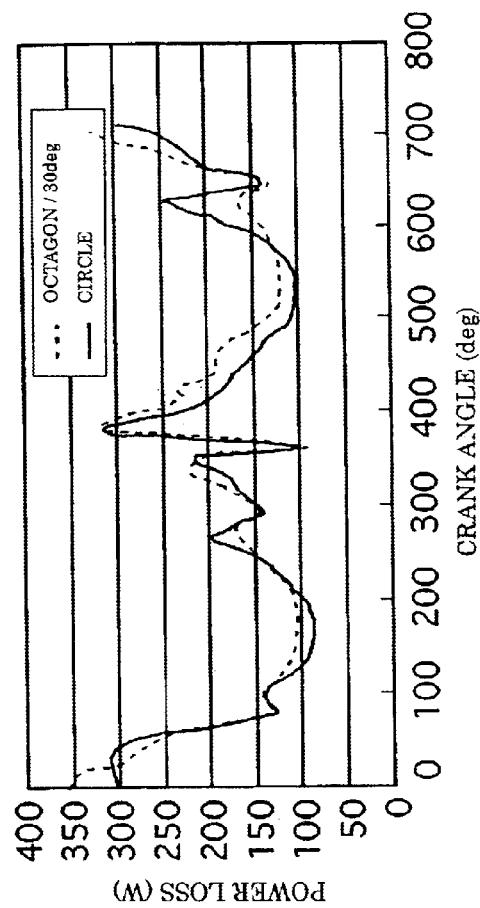
FIGS. 14(a), 14(b) and 14(c) are graphs showing the relation between the inclined angle and the power loss, the relation between the inclined angle and the minimum thickness of the oil film and the relation between the crank angle and the power loss, respectively wherein the sectional profile of the crankpin is octagonal.
Figure 14A:
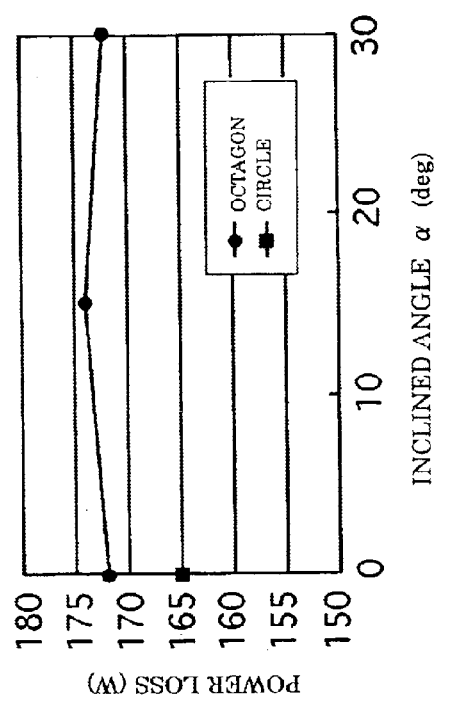
Figure 14B:
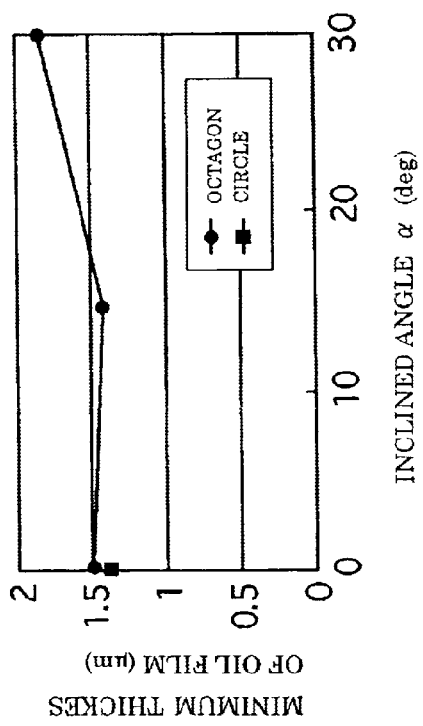

FIG. 14(b) shows the result of analysis in the minimum thickness of the oil film in connection to the inclined angle θ in the case of the octagonal crankpin 1. Where the inclined angle θ is chosen as 30 degrees wherein the smallest power loss is attained, the minimum thickness of the oil film is about 1.83 µm and is more than that in the case of the circular crankpin.

FIG. 14(c) shows the result of analysis in the power loss in connection to the crank angle ranging from 0 degree to 720 degrees for one cycle of the engine where the inclined angle θ of the octagonal crankpin 1 is chosen as 30 degrees. Like in the case of the triangular crankpin, the power loss in the case of the octagonal crankpin 1 is decreased, compared to that in the case of the circular crankpin around 30 degrees, 270 degrees, 330 degrees and 630 degrees of the crank angle. At other crank angles, however, the power loss is increased compared to that in the case of the circular crankpin.

Next, the result of analysis in the case of the nonagonal crankpin 1 will be described with reference to FIGS. 15(a), 15(b) and 15(c). Referring to FIG. 15(a), through out all the range of the inclined angle θ, the power loss in the case of the nonagonal crankpin 1 is increased in comparison to that in the case of the circular crankpin. For example, with the inclined angle θ chosen as 40 degrees, the power loss is the smallest and about 175 W.

FIG. 15(b) shows the result of analysis in the minimum thickness of the oil film in connection to the inclined angle θ in the case of the nonagonal crankpin 1 is a little less than that in the case of the circular crankpin. For example, with the inclined angle θ chosen as 0 degree, the minimum thickness of the oil film is about 1.31 µm.

FIG. 15(c) shows the result of analysis in the power loss in connection to the crank angle ranging from 0 degree to 720 degrees for one cycle of the engine where the inclined angle θ of the nonagonal crankpin 1 is chosen as 0 degree. Like the case of the triangular crankpin, the power loss in the case of the nonagonal crankpin 1 is decreased, compared to that in the case of the circular crankpin around 30 degrees, 270 degrees, 330 degrees and 630 degrees of the crank angle. At other crank angles, however, the power loss is increased compared to that in the case of the circular crankpin.

Figure 17:
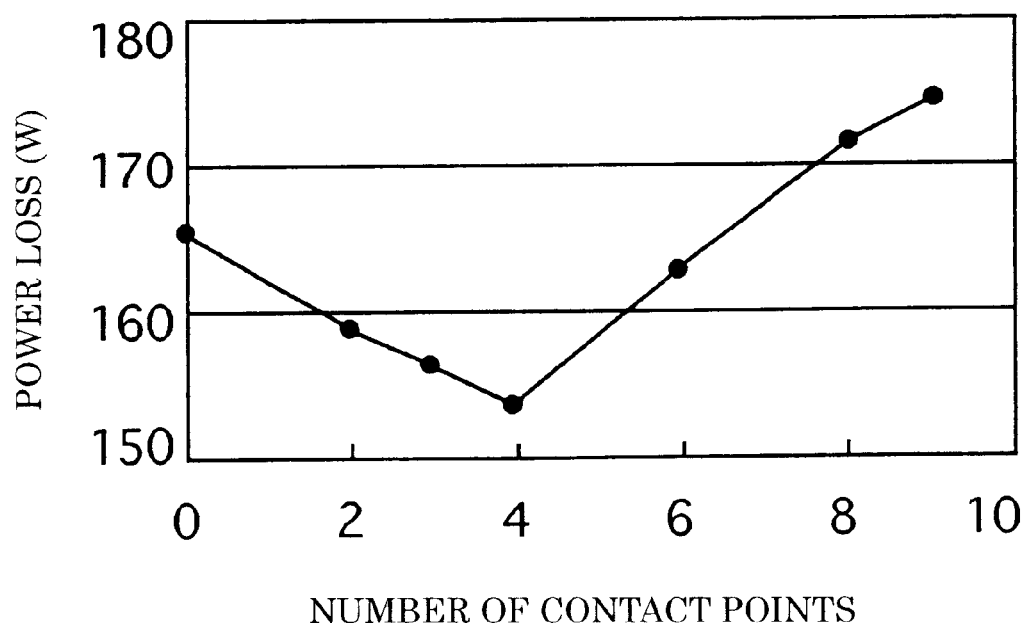
FIG. 17 is a graph showing the relation between the power loss and the number of the contact points.
Figure 18:
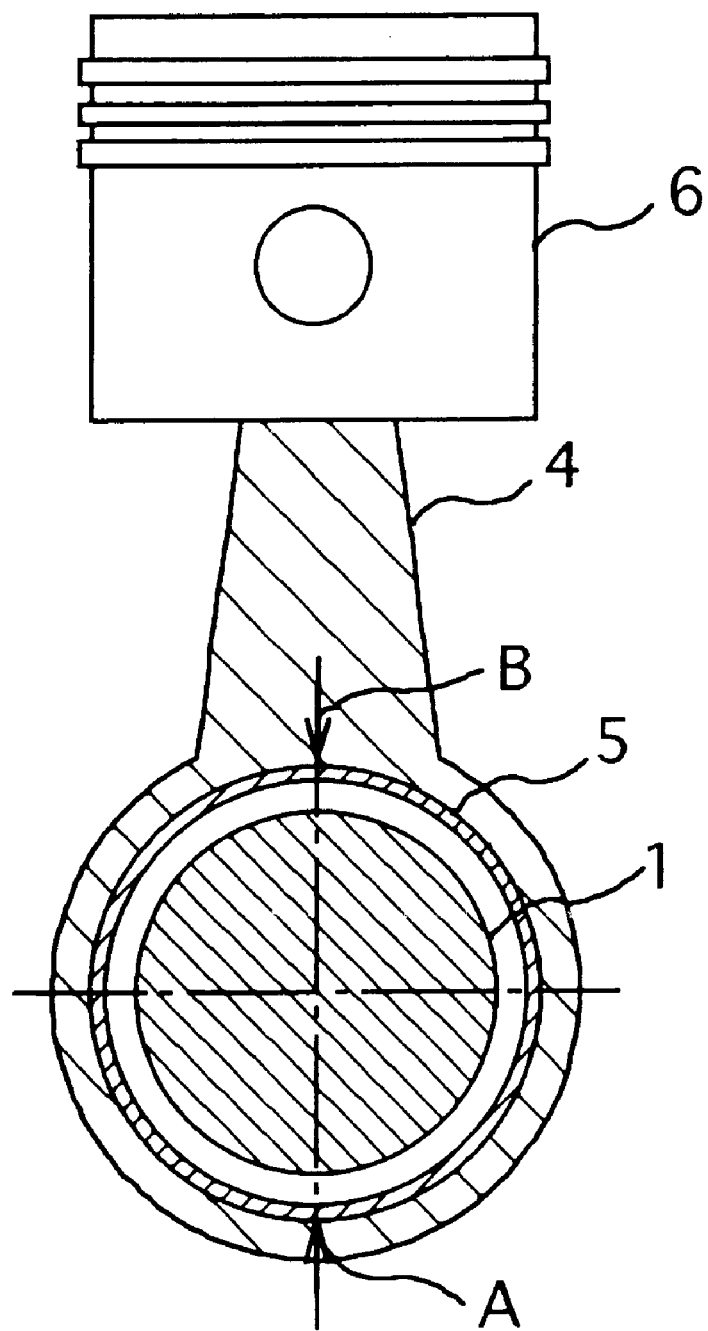
FIG. 18 shows the sectional profile of a crankpin in prior art.

According to the above results of analysis, the power loss and the minimum thickness of the oil film in each of the various sections and inclined angles of the crankpin 1 are summarized on a table in FIG. 16, and the power loss in connection to the number of the contact points 10 is shown in FIG. 17, when the smallest power loss.

In FIG. 17, zero in the contact points 10 represents the crankpin 1 having the true circular section and two in the contact points 10 represents the crankpin 1 having the elliptic section. As shown in FIGS. 16 and 17, the power loss in the case of the contact points 10 being between two and six in number is decreased compared to that in the case of no contact points 10 that is the circular crankpin. One of the reasons for this is that the pressure generated by the wedge effect works to reduce the deviation between the axis of the crankpin. 1 and the bearing 5 in the direction that the explosion force or the inertia force acts on the piston 6 and the bearing 5, whereby the squeeze loss can be minimized.

Further, the minimum thickness of the oil film in the case of the contact points 10 being between three and six is nearly equal to, or more than that in the case of the circular crankpin. Therefore, in the case of three to six contact points 10, the minimum thickness of the oil film is secured as thick as that in the case of the circular crankpin, so that the shear loss, a power loss, does not increase.

Especially, in the case of four contact points 10 (the square crankpin 1) with the inclined angle of 45 degrees, the power loss is decreased to the least. Namely, the power loss can be minimized where the square crankpin 1 takes the rotational position shown in FIG. 2 when at the T.D.C.

In short, by selecting the sectional shape of the crankpin 1 to be the polygon, the crescent space 11 can be provided, so that the bearing clearance can be varied. This makes it presumed that the wedge effect effectively works upon relative rotation between the bearing 5 and the crankpin 1. As the result, the crankpin 1, where taking a polygonal section, causes the power loss to be decreased compared with the circular crankpin. However, in the case of the contact points 10 as many as eight or more, the power loss is increased. The reason is presumed to be due to the churning resistance of the contact points 10.

Although in the foregoing analysis, the engine speed is defined to be 5000 rpm, other speeds, for example 1000 rpm, can be also used for the same effect. In this case, the same effect can be gained with the engine speed at 1000 rpm. Especially, remarkable advantage can be realized in the case of the engine speed at 4000 rpm to 5000 rpm.

Further, although the maximum clearance d1 is defined as 5 $\mu$m, it can be any larger clearance such as, for example, 30 $\mu$m. In this case, the power loss can be decreased more efficiency.

Furthermore, although the sectional profile of the bearing 5 is true circular, other profile can be used.

Moreover, the minimum thickness of the oil film in the case of the elliptic crankpin 1 is smaller than that in the case of the circular crankpin, thereby increasing the shear loss. As described in the first embodiment, however, the squeeze loss, a power loss, is decreased in the case of the elliptic crankpin, so that the power loss can be decreased in total as shown in FIG. 17.

1: crankpin
2: crank arm
3: crank journal
4: connecting rod
5: sliding bearing
6: piston
7: cylinder block
8: cylinder
9: hypothetical circle
10: contact point
11: crescent space
12: maximum clearance point
d1: maximum clearance
a: true circular crankpin
b: elliptic crankpin of the thick ellipse
c: elliptic crankpin of the thin ellipse
R: minimum clearance point
$\alpha$, $\theta$: inclined angle
$\beta$: angle between the line of apsides and the radial axis of the crank arm

What is claimed is:

1. A crankshaft comprising:
   a crank journal rotatably borne with a main bearing;
   an approximately cylindrical crankpin for supporting a connecting rod through a sliding bearing fitted therein;
   a crank arm connecting said crank journal with said crankpin; and
   wherein a hypothetical circle encircles and circumscribes the sectional profile of said crankpin; and
   wherein plural crescent spaces are located between said hypothetical circle and the sectional profile of said crankpin.

2. A crankshaft according to claim 1, wherein said crank arm has a radial axis for connecting the rotational axis of said crank journal with the axis of said crankpin, and an offset point remote from the axis of said crank journal where a radial clearance between said crankpin and said hypothetical circle is the largest is offset angularly from said radial axis of said crank arm.

3. A crankshaft according to claim 1, wherein the number of said crescent spaces is six at the most.

4. A crankshaft according to claim 2, wherein the number of said crescent spaces is two and said offset point is advanced 45 degrees from said radial axis of said crank arm in the rotational direction of said crank journal.

5. A crankshaft according to claim 2, wherein the number of said crescent spaces is three and said offset point is advanced 30 degrees from said radial axis of said crank arm in the rotational direction of said crank journal.

6. A crankshaft according to claim 2, wherein the number of said crescent spaces is four and said offset point is advanced 45 degrees from said radial axis of said crank arm in the rotational direction of said crank journal.

7. A crankshaft according to claim 2, wherein the number of said crescent spaces is six and said offset point is advanced 30 degrees from said radial axis of said crank arm in the rotational direction of said crank journal.

8. A crankshaft comprising:
   a crank journal rotatably borne with a main bearing;
   an approximately cylindrical crankpin for supporting a connecting rod through a sliding bearing fitted therein; and
   a crank arm connecting said crank journal with said crankpin;
   wherein the sectional profile of said crankpin is polygon whose circumference is made by connecting plural arcs of curvature.

9. A crankshaft according to claim 8, wherein said crank arm has a radial axis for connecting the rotational axis of said crank journal with an axis of said crankpin, and the middle point on one side of said polygon is offset angularly from said radial-axis of said crank arm.

10. A crankshaft according to claim 8, wherein said polygon is any one of ellipse, triangle, square, and hexagon.

11. An engine comprising:

a cylinder block formed with a cylinder;

a piston for reciprocating in said cylinder;

a connecting rod connected to said piston pivotably on an axis perpendicular to the reciprocating direction of said piston;

a crankshaft rotatably supported in said cylinder block for rotation on the axis of a crank journal and including;

an approximately cylindrical crankpin supporting said connecting rod through a sliding bearing fitted therein; and a crank arm connecting said crank journal with said crankpin;

wherein a hypothetical circle encircles and circumscribes the sectional profile of said crankpin; and wherein plural crescent spaces are located between said hypothetical circle and the sectional profile of said crankpin.

12. An engine according to claim 11, wherein the number of said crescent spaces is six at the most.

13. An engine according to claim 11, wherein said crank arm has a radial axis for connecting the rotational axis of said crank journal with the axis of said crankpin, and an offset point remote from the axis of said crank journal where a radial clearance between the sectional profile of said crankpin and said hypothetical circle is the largest is advanced from said radial axis of said crank arm in the rotational direction of said crank journal.

14. An engine according to claim 13, wherein the number of said hypothetical spaces is two and said offset point is advanced 45 degrees angularly from said radial axis of said crank arm.

15. An engine according to claim 13, wherein the number of said hypothetical spaces is three and said offset point is advanced 30 degrees angularly from said radial axis of said crank arm.

16. An engine according to claim 13, wherein the number of said hypothetical spaces is four and said offset point is advanced 45 degrees angularly from said radial axis of said crank arm.

17. An engine according to claim 13, wherein the number of said hypothetical spaces is six and said offset point is advanced 30 degrees angularly from said radial axis of said crank arm.

* * * * *